United States Patent [19]
Lefren

[11] Patent Number: 5,226,934
[45] Date of Patent: Jul. 13, 1993

[54] RECOVERY OF ELEMENTAL SULFUR FROM GASES

[75] Inventor: K. Edward Lefren, Yorklyn, Del.

[73] Assignee: University of Delaware, Newark, Del.

[21] Appl. No.: 896,019

[22] Filed: Jun. 9, 1992

[51] Int. Cl.$^5$ .................. B01D 47/14; B01D 53/14
[52] U.S. Cl. ........................................ 55/73; 55/94; 423/210.5; 423/242.1; 423/539
[58] Field of Search .............................. 55/73, 84, 94; 423/210.5, 242.1–242.7, 539, 543

[56] References Cited
U.S. PATENT DOCUMENTS

| | | |
|---|---|---|
| 1,957,006 | 5/1934 | Wescott ............................. 55/73 X |
| 1,972,884 | 9/1934 | Gleason et al. ..................... 55/73 X |
| 1,972,885 | 9/1934 | Gleason et al. ..................... 55/73 X |
| 2,726,933 | 12/1955 | Merriam et al. .................... 423/543 |
| 2,780,307 | 2/1957 | MacAfee ............................ 55/73 X |
| 3,773,893 | 11/1973 | Mandelin ............................ 55/73 X |
| 4,046,867 | 9/1977 | Seeling et al. ....................... 55/73 X |
| 5,017,350 | 5/1991 | Hakka et al. ........................ 423/243 |
| 5,023,063 | 6/1991 | Stiles ................................... 423/244 |

Primary Examiner—Robert Spitzer
Attorney, Agent, or Firm—Dean R. Rexford; James H. Ryan

[57] ABSTRACT

A process for the separation of elemental sulfur from a gas comprises contacting the gas with molten sulfur whereby to extract the sulfur from the gas.

8 Claims, 1 Drawing Sheet

RECOVERY OF ELEMENTAL SULFUR FROM GASES

BACKGROUND OF THE INVENTION

1. Field of the Invention

This invention pertains to the removal and recovery of sulfur from various industrial gas streams, in particular those gas streams containing elemental sulfur. Special utility is seen in the processing of flue gases in which sulfur dioxide has been reduced to elemental sulfur.

2. Background of the Invention and Description of Related Art Including Information Disclosed Under 37 CFR 1.97–1.99

Acid rain is thought to be caused by reaction between water and sulfur oxides and/or nitrogen oxides to produce the corresponding acids in the atmosphere. It is believed that sulfur oxides enter the environment in large part on combustion of sulfur-containing coal, and to a lesser extent oil and natural gas, in electric power generating plants and other industrial plants. The problem is serious and substantial attention has been devoted to its solution. Semrau reviewed the topic of industrial process sources of sulfur oxides in *Advances in Chemistry Series* 139 1–22 (1974).

A well known and probably preferred integrated catalytic process for removing sulfur oxides from the flue gas streams and recovering elementary sulfur comprises adjusting the redox conditions in or near the furnace so as to reduce the sulfur oxides to hydrogen sulfide. The hydrogen sulfide is thereafter extracted from the flue gas and sent to an elemental sulfur recovery step such as the Claus process wherein the hydrogen sulfide is oxidized to water and elemental sulfur. Brocoff in U.S. Pat. No. 4,012,488 teaches the use of hydrocarbons such as methane to reduce sulfur dioxide to hydrogen sulfide. Other processes oxidize hydrogen sulfide to elemental sulfur in solution, as disclosed, for example, by Nicklin et al in U.S. Pat. Nos. 2,997,439, 3,035,889 and 3,097,926. Gorlich in U.S. Pat. Nos. 4,874,589, and 4,880,606 also teaches the oxidation in solution of hydrogen sulfide to elemental sulfur using oxygen in the presence of 1,4-naphthoquinone-2-sulfonate. In the latter case, the sulfur is recovered by filtration.

Processes for the extraction of hydrogen sulfide from gas are described by Oliveau in U.S. Pat. No. 4,844,876, by Elgue in U.S. Pat. No. 4,889,700, and by Hakka in U.S. Pat. No. 5,017,350. The latter patent also teaches the extraction of sulfur dioxide, inter alia.

Stiles in U.S. Pat. No. 5,023,063 and pending divisional application Ser. No. 07/694,085 filed May 1, 1991, now U.S. Pat. No. 5,176,888, teaches a method for catalytically reducing nitrogen and sulfur oxides in flue gases with reducing gases, e.g. hydrogen or hydrogen-carbon monoxide, to produce respectively nitrogen and water, and sulfur and water. Stiles suggests the use of cyclones, filters or electrostatic precipitation to remove the elemental sulfur thus formed, from the product gas stream. The product stream contains entrained sulfur vapor. Condensation to permit treatment of solid sulfur-gas mixtures by the means suggested, risks the formation of a range of particle sizes difficult to accommodate by the suggested cyclones or electrostatic precipitation. Further there is the very real danger of the deposition of sticky, amorphous sulfur on condensers or dephlegmators or of highly viscous sulfur which could not be processed by any of the suggested means.

SUMMARY OF THE INVENTION

There has now been conceived an integrated process consisting of direct reduction of sulfur oxides to elementary sulfur according to Stiles supra and separation of the sulfur thus formed according to the instant invention. Thus this invention is directed to the removal of sulfur from a gas, said process comprising contacting said gas with molten sulfur in a critical temperature range, thereby extracting the sulfur from the gas.

A feature critical to the successful operation of the invention process comprises adjusting the temperature of the molten sulfur to a temperature within the range of about 123–160 deg. C. such that the temperature of the molten sulfur, on contact with the gas in a first step, remains within the range of 123–160 deg. C., and in a second step, exposing the gas to a counter current stream of molten sulfur, also on the range of 123–160 deg. C., in a vertical, packed scrubber. The temperature conditions of the first step are readily achieved by an automatic feed-back system, as is known in the art, or by manual adjustment.

Although applicant does not wish to be limited thereto, special utility is seen in the application of the invention process to flue gas treated according to that feature of the Stiles invention supra wherein the sulfur oxides are reduced to elemental sulfur.

DESCRIPTION OF THE PREFERRED EMBODIMENTS

Figure 1:
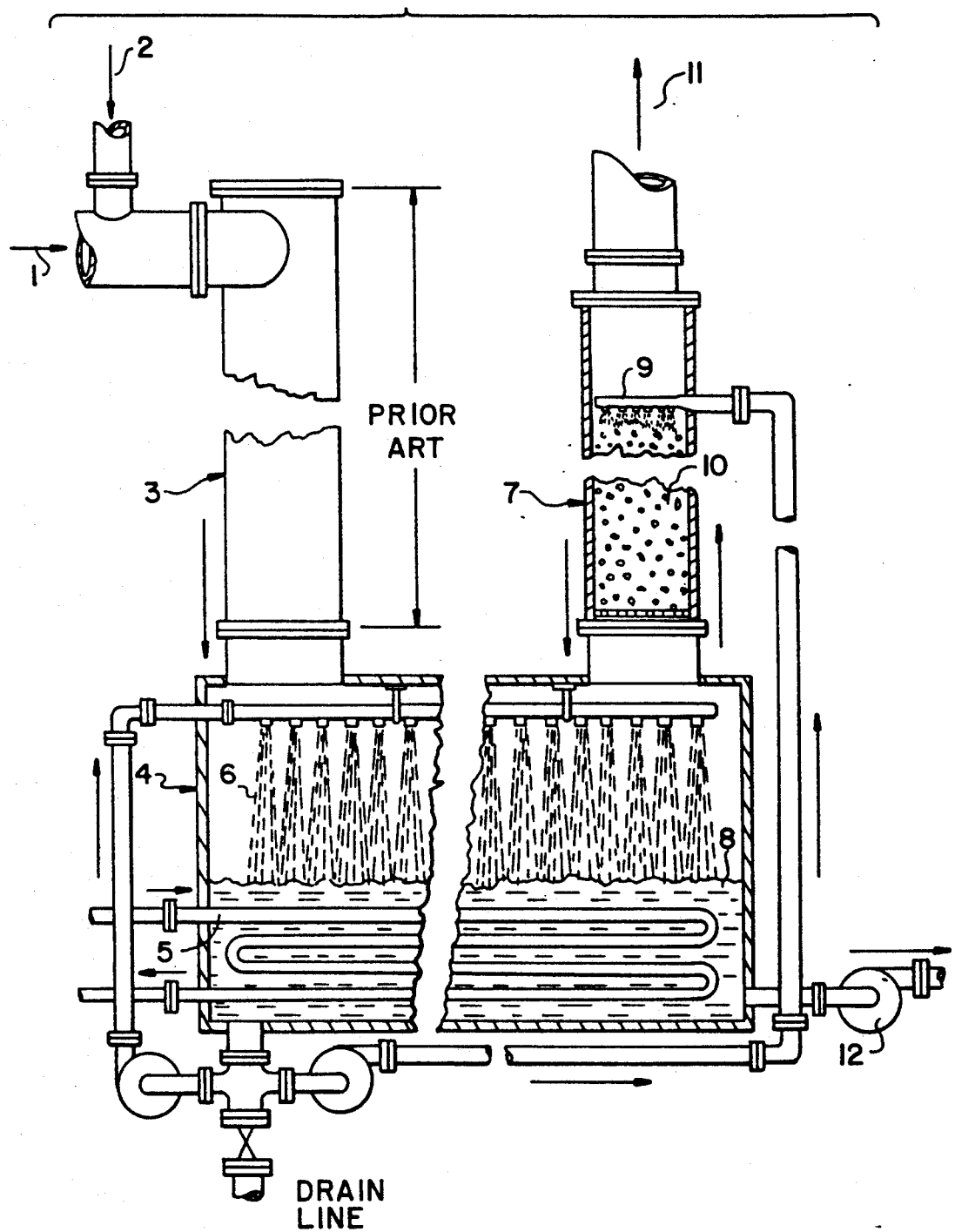
FIG. 1 shows an elevation view of a preferred two-step embodiment of the instant invention wherein parts 1 through 3 are an embodiment of prior art Stiles, U.S. Pat. No. 5,023,063.

Before proceeding to a detailed description of the process of FIG. 1, it is deemed useful to set out in table 1 the saturation vapor pressure, and derived volume percent of sulfur at saturation and in table 2 the viscosity of elemental sulfur as a function of temperature. Vapor pressure data were taken from Perry, Chemical Engineers' Handbook, 3rd, Ed., McGraw-Hill Book Company, Inc., New York, N.Y. (1950) p. 152. Viscosity data were taken from Weast, CRC Handbook of Chemistry and Physics, CRC Press, Inc., Boca Raton, Fla. (1981), p. F-57, and, for the higher temperatures, Fowle, Smithsonian Physical Tables, Smithsonian Institution, Washington, D.C. (1927) p. 157.

TABLE 1

| Temperature (deg. C.) | Saturation vapor pressure (mm Hg) | Proportion of sulfur at saturation and 760 mm abs pressure (vol. %) |
| --- | --- | --- |
| 184 | 1 | 0.13 |
| 244 | 10 | 1.3 |
| 327 | 100 | 13.2 |
| 400 | 400 | 52.6 |
| 445 | 760 | 100.0 |

TABLE 2

| Temperature (deg. C.) | Viscosity (centipoises) |
| --- | --- |
| 123 | 10.9 |
| 136 | 8.7 |

TABLE 2-continued

| Temperature (deg. C.) | Viscosity (centipoises) |
| --- | --- |
| 149 | 7.1 |
| 156 | 7.2 |
| 158 | 7.6 |
| 160 | 22.8 |
| 165 | 500 |
| 170 | 32000 |
| 300 | 2400 |
| 340 | 620 |
| 380 | 250 |
| 420 | 113 |
| 448 | 80 |

FIG. 1 shows the process of the instant invention integrated with the process of Stiles supra. In this embodiment of the invention, the apparatus receives the Stiles process gaseous output comprising elemental sulfur resulting from the reduction of flue gas sulfur oxides. The sulfur is usually in the gaseous state as predicted by table 1. Parts 1, 2, and 3 represent an embodiment of the Stiles invention wherein flue gas stream 1 containing oxides of sulfur inter alia, is mixed with reducing gas stream 2, comprising hydrogen or hydrogen and carbon monoxide, and the mixture is led into catalytic reactor 3. In this embodiment the stream enters the reactor 3 tangentially to ensure mixing. The catalytic reaction of Stiles takes place at elevated temperature, for example at about 316 deg. C. and the gas mixture arrives in receiving tank 4 at about that temperature. Reference to table 2 will confirm that simple cooling of the gas mixture to condense the entrained gaseous sulfur would take the liquid sulfur through a domain of very high viscosity which might effectively block gas conduits making the process inoperable. The instant invention avoids the problem by the novel process of cooling the gas mixture by contact with sprays of liquid sulfur at temperatures so selected as to temperature and flow rate to bring the sulfur in the gas mixture stream quickly into the low viscosity range, i.e., about 123-160 deg. C. In order to cool the liquid sulfur 8, heated by the hot gas stream to a lower temperature characterized by lower sulfur viscosity, cooling coils 5 are provided, normally carrying water, which maintain the temperature of the molten sulfur during flow through receiving tank 4 at about 123-160 deg. C. This temperature range defines the low viscosity domain of molten sulfur. The receiver tank, and its contents, act as a heat sink for absorbing and rejecting heat. Thus, although the temperature on first contact between gas and sprays may rise briefly above the range of low viscosity, i.e., above 160 deg. C., the excess heat is quickly absorbed by the liquid sulfur. In the claims wherein a temperature range of 123 to 160 deg. C. is specified, it is understood that this brief excursion outside the range falls within the claims. The selection of size and arrangement of the cooling coils is within the skill of the professional engineer. The adjustment of the temperature of sulfur 8, upward or downward, to 123 to 160 deg. C. is critical.

The gas stream containing sulfur passes through receiving tank 4 in contact with molten sulfur sprays 6 thereby cooling the gas and extracting sulfur from it. The sprayed liquid sulfur, captured sulfur and fly ash, if present, collect in receiving tank 4. In most cases the losses of sulfur to the environment after contact with sprays 6, may be acceptable. Further scrubbing, as described below, will capture carry-over of sulfur in the gas stream leaving the receiving tank.

In the preferred two-step embodiment, the gas mixture after passing through receiving tank 4 enters scrubber 7 carrying with it entrained sulfur and fly ash not captured in receiving tank 4. Molten sulfur 8 is pumped from the receiving tank 4 to spray nozzles 9 arranged in the upper part of scrubber 7 so as to distribute the molten sulfur more or less evenly over packing 10. Thus, the gas moves upward against a counter current stream of molten sulfur whereby intimate contact between the two streams is effected. Choice of packing is not critical so long as the packing is not quickly plugged with fly ash. Berl saddles of appropriate size, for example, are satisfactory. The scrubbed gases 11 leave the scrubber at about 123-160 deg. C. At these temperatures the partial pressure of the sulfur is less than 1 mm Hg as set out in table 1. Thus loss of sulfur vapor to the environment is trivial.

Pump 12 removes molten sulfur with entrained fly ash to filters not shown to remove the fly ash after which the filtered sulfur is sent to storage and cooled for sale.

Other means for contacting the gas with molten sulfur are contemplated, for example, splashing agitation in receiving tank 4. Sprays are preferred, however.

The foregoing description applies to the use of the instant invention, integrated with a flue gas process of Stiles. Other uses for the invention process are seen, for example, as a step in the recovery of sulfur from smelting operations performed on sulfur-bearing ores such as copper sulfide.

Having now described my invention, I claim:

1. The process of removing elemental sulfur from a hot gas containing the same which comprises
   introducing the gas into a receiving tank having means for intimately contacting the gas with molten sulfur and containing a pool of molten sulfur maintained at a temperature within the range of 123° to 160° C., and
   in the receiving tank intimately contacting the hot gas with molten sulfur in the range of 123° to 160° C. thereby controlling the temperature of the gas to within the range of 123° to 160° C. and removing elemental sulfur from the gas.

2. The process of claim 1 wherein the gas is a hot flue gas in which the sulfur dioxide has been reduced to elemental sulfur.

3. The process of claim 1 wherein the method for contacting the hot gas with molten sulfur is exposing the same to a plurality of molten sulfur sprays.

4. The process of claim 3 wherein the gas is a hot flue gas in which the sulfur dioxide has been reduced to elemental sulfur.

5. The process of claim 3 wherein the plurality of molten sulfur sprays are distributed along the path of the hot gas through the receiving tank.

6. The process of claim 5 wherein the gas is a hot flue gas in which the sulfur dioxide has been reduced to elemental sulfur.

7. The process of claim 1 wherein the hot gas is removed from the receiving tank through a counter current flow of molten sulfur in a vertical packed scrubber at 123°-160° C.

8. The process of claim 1 wherein the hot gas is a hot flue gas from smelting sulfur bearing ores.

* * * * *